United States Patent
Tarafdar et al.

(10) Patent No.: US 8,741,817 B2
(45) Date of Patent: Jun. 3, 2014

(54) WATER-BASED FLUID LOSS ADDITIVE CONTAINING AN AMPHIPHILIC DISPERSANT FOR USE IN A WELL

(75) Inventors: Abhijit Tarafdar, Pune (IN); Remitha Ak, Pune (IN); Rahul Chandrakant Patil, Pune (IN); Vikrant Wagle, Mumbai (IN)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 13/553,767

(22) Filed: Jul. 19, 2012

(65) Prior Publication Data

US 2012/0283152 A1 Nov. 8, 2012

Related U.S. Application Data

(62) Division of application No. 12/817,261, filed on Jun. 17, 2010, now Pat. No. 8,485,255.

(51) Int. Cl.
| | |
|---|---|
| *C09K 8/508* | (2006.01) |
| *C04B 28/02* | (2006.01) |
| *C09K 8/487* | (2006.01) |
| *C09K 8/40* | (2006.01) |
| *C09K 8/514* | (2006.01) |
| *C09K 8/12* | (2006.01) |
| *C04B 103/00* | (2006.01) |

(52) U.S. Cl.
CPC ............... *C09K 8/514* (2013.01); *C04B 28/02* (2013.01); *C04B 2103/0028* (2013.01); *C09K 8/487* (2013.01); *C09K 8/40* (2013.01); *C09K 8/12* (2013.01)
USPC .................. 507/211; 507/219; 166/305.1

(58) Field of Classification Search
None
See application file for complete search history.

(56) References Cited

U.S. PATENT DOCUMENTS

| | | | |
|---|---|---|---|
| 3,710,865 A | 1/1973 | Kiel | |
| 4,432,881 A * | 2/1984 | Evani | 507/121 |
| 4,557,763 A | 12/1985 | George et al. | |
| 5,007,489 A | 4/1991 | Enright et al. | |
| 5,340,860 A | 8/1994 | Brake et al. | |
| 5,348,584 A * | 9/1994 | Brothers et al. | 106/725 |
| 5,378,756 A * | 1/1995 | Thies et al. | 524/591 |
| 5,499,677 A | 3/1996 | Cowan | |
| 6,150,445 A * | 11/2000 | Bostrom et al. | 524/378 |
| 7,056,868 B2 | 6/2006 | Benton et al. | |
| 7,919,437 B2 | 4/2011 | Duncum et al. | |
| 2005/0124503 A1* | 6/2005 | Morgan et al. | 507/226 |
| 2006/0020145 A1 | 1/2006 | Lal et al. | |

FOREIGN PATENT DOCUMENTS

WO 2010082113 A2 7/2010

* cited by examiner

*Primary Examiner* — Alicia Bland
(74) *Attorney, Agent, or Firm* — Craig W. Roddy; Sheri Higgins Law; Sheri Higgins

(57) ABSTRACT

A well treatment composition comprises: an aqueous liquid; a fluid loss additive, wherein the fluid loss additive comprises a high molecular weight, water-swellable polymer; and an amphiphilic dispersant, wherein the well treatment composition has an activity of at least 10%. A method of cementing in a subterranean formation comprises: introducing a cement composition into the subterranean formation, the cement composition comprising: (i) cement; (ii) water; and (iii) the well treatment composition; and allowing the cement composition to set.

14 Claims, No Drawings

WATER-BASED FLUID LOSS ADDITIVE CONTAINING AN AMPHIPHILIC DISPERSANT FOR USE IN A WELL

CROSS-REFERENCE TO RELATED APPLICATION

This application is a divisional of and claims priority to application Ser. No. 12/817,261, filed Jun. 17, 2010.

TECHNICAL FIELD

A well treatment composition comprising a water-based fluid loss control additive is provided. A method of preparation of the well treatment composition is also provided. A method of cementing in a subterranean formation using the well treatment composition is also provided. In an embodiment, the subterranean formation is penetrated by a well.

SUMMARY

According to an embodiment, a well treatment composition comprises: an aqueous liquid; a fluid loss additive, wherein the fluid loss additive comprises a high molecular weight, water-swellable polymer; and an amphiphilic dispersant, wherein the well treatment composition has an activity of at least 10%.

According to another embodiment, a method of cementing in a subterranean formation comprises: introducing a cement composition into the subterranean formation, the cement composition comprising: (i) cement; (ii) water; and (iii) the well treatment composition; and allowing the cement composition to set.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," and "third," are arbitrarily assigned and are merely intended to differentiate between two or more monomers, fluids, etc., as the case may be, and does not indicate any sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid is a liquid or gas. As used herein, a "fluid" can have more than one distinct phase. For example, a "fluid" can be a colloid. A colloid can be: a sol, which includes a continuous liquid phase and undissolved nanometer-sized solid particles (<500 nm) as the dispersed phase; an emulsion, which includes a continuous liquid phase and at least one dispersed phase of immiscible liquid droplets; or a foam, which includes a continuous liquid phase and gas as the dispersed phase. Another example of a fluid having more than one distinct phase is a suspension. As used herein, a "suspension" is a two-phase system with solid particles dispersed in a liquid continuous phase in which the dispersed phase can settle out of the continuous phase over time or through centrifugation.

As used herein, a "fluid" can have only one phase. An example of a fluid having only one phase is a solution. As used herein, a "solution" is a homogenous mixture of two or more substances. A "solute" is the dissolved substance in the solution. For example, a solute can be a solid or a liquid. A "solvent" is the substance that is generally the most abundant in the solution and is capable of dissolving other substances. A solution can become saturated. Saturation refers to the point at which a solution of a solute can dissolve no more of that solute and additional amounts of the solute will appear as a precipitate. A solution can be a supersaturated solution. A supersaturated solution refers to a solution that contains more of a dissolved solute than could be dissolved by the solvent under normal circumstances.

As used herein, an "oil solution" is a solution in which the solvent is a hydrocarbon liquid. As used herein, an "aqueous solution" is a solution in which the solvent is an aqueous liquid. As used herein, the term "oil-based" means an oil solution or a colloid or a suspension in which a hydrocarbon liquid is the continuous phase. As used herein, the term "water-based" means an aqueous solution or a colloid or a suspension in which an aqueous liquid is the continuous phase.

As used herein, a "cement composition" is a mixture of at least cement and water, and possibly other additives. As used herein, the term "cement" means a dry substance that acts as a binder to bind other materials together.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can be an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In a typical open-hole wellbore portion, a tubing string is placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of the casing in a cased-hole wellbore; and the space between the tubing string and the inside of the casing in a cased-hole wellbore.

During well completion, it is common to introduce a cement composition into an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus.

Consequently, oil or gas can be produced in a controlled manner by directing the flow of oil or gas through the casing and into the wellhead. Cement compositions can also be used in well-plugging operations or gravel-packing operations.

However, fluids, such as water, included in a cement composition can penetrate into the surrounding subterranean formation. This is commonly referred to as fluid loss. The loss of significant amounts of fluid from the cement composition into the formation can adversely affect, inter alia, the viscosity, thickening time, setting time, and compressive strength of the cement composition. Therefore, it is common to include a fluid loss additive in a cement composition in order to help minimize the amount of fluid that is lost from the cement composition into the subterranean formation.

It is sometimes beneficial to add a well treatment composition containing an additive to a cement composition as an aqueous solution. For example, a fluid loss additive can be prepared as an aqueous solution. The aqueous solution can be prepared and can then be added to cement, water, and any other ingredients on the fly at a work site to form a cement composition. The cement composition can then be introduced into a subterranean formation.

Water-swellable polymers have been used as a fluid loss additive. A polymer is a large molecule composed of repeating units typically connected by covalent chemical bonds. A polymer is formed from the polymerization reaction of monomers. A polymer formed from one type of monomer is called a homopolymer. A copolymer is formed from two or more different types of monomers. In the polymerization reaction, the monomers are transformed into the repeating units of a polymer. The number of repeating units of a polymer can range from approximately 4 to greater than 10,000. The number of repeating units of a polymer is referred to as the chain length of the polymer. The conditions of the polymerization reaction can be adjusted to help control the average number of repeating units (the average chain length) of a polymer. A polymer also has an average molecular weight, which is directly related to the average chain length of the polymer. The average molecular weight of a polymer has an impact on some of the physical characteristics of a polymer, for example, its solubility in water.

The average molecular weight for a copolymer can be expressed as follows:

Avg. molecular weight=(M.W.$m_1$*$RU\ m_1$)+ (M.W.$m_2$*$RU\ m_2$)

where M.W.$m_1$ is the molecular weight of the first monomer; RU $m_1$ is the number of repeating units of the first monomer; M.W.$m_2$ is the molecular weight of the second monomer; and RU $m_2$ is the number of repeating units of the second monomer. Of course, a terpolymer would include three monomers, a tetrapolymer would include four monomers, and so on.

Polymer molecules can be cross-linked. As used herein, a "cross-link" or "cross-linking" is a connection between two or more polymer molecules. Cross-linking can increase the molecular weight of the polymer molecules. In general, as the molecular weight of a polymer or cross-linked polymer molecules increases, its solubility decreases. As a result, some high molecular weight polymers can become water swellable when their molecular weight increases above a certain limit. As used herein, the term "water swellable" means a polymer or cross-linked polymer that can absorb water and can swell. As used herein, a "low molecular weight polymer" means a polymer or cross-linked polymer with an average molecular weight of less than 50,000. As used herein, a "high molecular weight polymer" means a polymer or cross-linked polymer with an average molecular weight of greater than 50,000.

For a copolymer, the repeating units for each of the monomers can be arranged in various ways along the polymer chain. For example, the repeating units can be random, alternating, periodic, or block.

It can be difficult to make an aqueous solution with a water-swellable polymer because the polymer may not fully dissolve in the water. As a result, a colloid, may be formed. Some water-swellable polymers can also form fish eyes in a water-based fluid. A fish eye generally occurs during the process of blending the water-swellable polymer with an aqueous liquid. Fish eyes are balls of unhydrated polymer surrounded by a gelatinous covering of hydrated polymer. Fish eyes prevent water from contacting the interior of the fish eye and the unhydrated polymer contained therein. Fish eyes can be difficult to break apart once formed. A liquid containing fish eyes is generally not homogenous. As used herein, the term "homogenous" means a solution, or a colloid or a suspension in which undissolved solids are dispersed uniformly throughout the continuous phase. It is desirable to have a homogenous well treatment composition.

In order to overcome the problem of fish-eye formation, an oil-based suspension containing a water-swellable polymer can be used. However, an oil-based suspension containing a water-swellable polymer can be unstable. Instability refers to a homogenous suspension in which the uniformly dispersed undissolved solids settle out of the continuous liquid phase over time. By contrast, a stable suspension can remain homogenous over the course of several weeks to several months.

In addition to the problem of fish-eye formation, a water-based fluid that contains a water-swellable polymer can become too viscous to pour the fluid out of a blending or storage container to be included in a cement composition. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is 1/100 P. The viscosity of a material and pourability are related. The higher the viscosity, the less easily the material can be poured. Conversely, the lower the viscosity, the more easily the material can be poured. It is desirable for a well treatment composition to be pourable.

As used herein, the "viscosity" of a material is measured according to API RP 10B-2/ISO 10426-2 as follows. The material to be tested, such as an aqueous solution or a suspension, is prepared. The material is placed into the test cell of a rotational viscometer, such as a FANN® Model 35 viscometer, fitted with a FANN® Yield Stress Adapter (FYSA) The material is tested at ambient temperature and pressure, about 71° F. (22° C.) and about 1 atm (0.1 MPa). Viscosity can be calculated using the following equation, expressed in units of centipoise:

$$V = \frac{k_1}{k_2}(1000)\frac{\theta}{N}$$

where $k_1$ is a constant that depends on the FYSA in units of 1/s; $k_2$ is a constant that depends on the FYSA in units of Pa; (1000) is the conversion constant from Pa*s to centipoise; e is the dial reading on the viscometer; and N is the rpm.

Rheology is a unit-less measure of how a material deforms and flows. Rheology includes the material's elasticity, plasticity, and viscosity. As used herein, the "rheology" of a material, such as an aqueous solution or a cement composition, is measured as follows. The material to be tested is prepared. The material is placed into the test cell of a rotational viscometer, such as a FANN® Model 35 viscometer, fitted with a FYSA attachment and a spring number 1. The material is tested at ambient temperature and pressure, about 71° F. (22° C.) and about 1 atm (0.1 MPa). Rheology readings are taken at multiple rpm, for example, at 3, 6, 30, 60, 100, 200, and 300.

Another desirable characteristic of a well treatment composition is a high amount of activity. The higher the activity, the less volume of concentrate is required. As such, there can be lower transportation costs and less space required to store the liquid concentrate. As used herein, the term "activity" means the total percent of active solids in a solution or in a colloid or suspension. For example, a well treatment composition can have an activity of 10%, which means that there is 10 grams (g) of active solid present in 100 g of the liquid. It is believed that the activity of a well treatment composition can be increased by increasing the active solid loading into the composition. For example, by increasing the solubility of the solute, a solution with a higher activity can be formed as opposed to a suspension, or a supersaturated solution can be formed as opposed to a saturated solution.

It has been discovered that a well treatment composition, containing: an aqueous liquid; a high molecular weight, water-swellable polymer as a fluid loss additive; and an amphiphilic dispersant, can be made as a solution. Some of the advantages of the well treatment composition is that the composition: is more homogenous; is more stable; is less viscous; pours more easily; and has a higher activity compared to a composition without the amphiphilic dispersant.

An amphiphilic dispersant can increase the water solubility of some compounds that are poorly soluble in water. One example of an amphiphilic dispersant is a surfactant. A surfactant comprises a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant that has a neutral charge is called a non-ionic surfactant.

If a surfactant is in a sufficient concentration in a solution, then the surfactant molecules can form micelles. A "micelle" is an aggregate of surfactant molecules dispersed in a solution. A surfactant in an oil solution can form reverse-micelles with the hydrophobic tails in contact with the hydrocarbon solvent, sequestering the hydrophilic heads in the center of the reverse-micelle. Conversely, a surfactant in an aqueous solution can form micelles with the hydrophilic heads in contact with the surrounding aqueous solvent, sequestering the hydrophobic tails in the micelle center. The surfactant must be in a sufficient concentration to form a reverse-micelle or micelle, known as the critical micelle concentration. The critical micelle concentration is the concentration of surfactant above which reverse-micelles or micelles are spontaneously formed.

Another example of an amphiphilic dispersant is a hydrotrope. The ability of a hydrotrope to increase the water solubility of some compounds is known as hydrotropy. Hydrotropes contain both a hydrophilic and a hydrophobic functional group. The hydrophobic part of the molecule is a benzene substituted apolar segment. For example, the hydrophobic part can be N-butyl benzene, dodecyl benzene, dimethyl benzene (commonly referred to as xylene), and methyl ethyl benzene (commonly referred to as cumene). The hydrophilic, polar segment is an anionic sulfonate group accompanied by a counter ion (e.g., ammonium, calcium, potassium or sodium). Hydrotropes are produced by sulfonation of an aromatic hydrocarbon solvent, for example, toluene, xylene, or cumene. The resulting aromatic sulfonic acid is neutralized using an appropriate base (e.g., sodium hydroxide) to produce the sulfonate or hydrotrope.

Generally, the hydrophobic part of a hydrotrope is too small to cause spontaneous self-aggregation. Self-aggregation is similar to micelle formation for a surfactant. However, some hydrotropes can self-aggregate. Self-aggregation of a hydrotrope is generally formed in a step-wise process, with the size of the aggregate gradually increasing. Unlike the critical micelle concentration for a surfactant, a hydrotrope generally does not have a critical concentration at which self-aggregation occurs. Rather, the ability of a hydrotrope to self-aggregate appears to be more related to the chemical structure of the hydrotrope.

A well treatment composition can be added to cement, water, and possibly other additives to form a cement composition. During cementing operations, it is desirable for the cement composition to remain pumpable during introduction into a subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes, and a cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., thickening time or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about −16° C./min to about −15° C./min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition.

The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition sample taken at a specified time after mixing and by breaking the samples in a compression-testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

Fluid loss from a cement composition can occur. As used herein, the "fluid loss" of a cement composition is tested according to the API static fluid loss procedure at a specified temperature and pressure differential as follows. The cement composition is mixed. The cement composition is placed into an atmospheric consistometer, such as a FANN® Model 165 AT consistometer, heated to the specified temperature, and then maintained at the specified temperature for 20 minutes. A test cell of a fluid loss test assembly, such as a FANN® fluid loss test assembly, is pre-heated to the specified temperature. The cement composition is then placed into the test cell of the fluid loss test assembly. The cement composition is then tested for fluid loss at the specified pressure differential. Fluid loss is measured in milliliters (mL) of fluid collected in 30 min. The total mL of fluid loss is then multiplied by 2 to obtain the API fluid loss for the cement composition in mL/30 min.

According to an embodiment, a well treatment composition comprises: an aqueous liquid; a fluid loss additive, wherein the fluid loss additive comprises a high molecular weight, water-swellable polymer; and an amphiphilic dispersant, wherein the well treatment composition has an activity of at least 10%.

According to another embodiment, a method of cementing in a subterranean formation comprises: introducing a cement composition into the subterranean formation, the cement composition comprising: (i) cement; (ii) water; and (iii) the well treatment composition; and allowing the cement composition to set.

The discussion of preferred embodiments regarding the well treatment composition, or any ingredient in the well treatment composition, is intended to apply to the composition embodiments and the method embodiments. Any reference to the unit "gallons" means U.S. gallons.

The well treatment composition includes an aqueous liquid. The well treatment composition can be a solution, a colloid, or a suspension. The solution can be a supersaturated solution. For a solution, the aqueous liquid is the solvent of the solution. It is preferred that the well treatment composition is a solution. For a colloid or suspension, the aqueous liquid comprises the continuous phase. For a colloid or suspension, the continuous phase can contain dissolved solids. The well treatment composition can be a sol in which the aqueous liquid comprises the continuous phase and solid particles are suspended in the continuous phase. The well treatment composition can also be an emulsion in which the aqueous liquid comprises the continuous phase and a hydrocarbon liquid is the dispersed phase. Also, if the well treatment composition is an emulsion, then the continuous phase can also include dissolved solids or undissolved solid particles suspended in the continuous phase. The aqueous liquid can be selected from the group consisting of freshwater, brackish water, saltwater, and any combination thereof.

The well treatment composition includes a fluid loss additive, wherein the fluid loss additive comprises a high molecular weight, water-swellable polymer. It is preferable that the fluid loss additive is non-retarding. As used herein, the term "non-retarding" means the fluid loss additive does not substantially delay the setting time of a cement composition that contains the fluid loss additive compared to a substantially identical cement composition except without the fluid loss additive.

The polymer for the fluid loss additive can comprise: cellulose; guar; xanthan; starch; a monomer or monomers selected from the group consisting of acrylamido-methylpropane sulfonate (AMPS), N-vinyl-N-methylaceamide, N-vinylformamide, N-vinylpyrrolidone, acrylonitrile, acrylamide, acrylomorpholine, vinyl alcohol, maleic anhydride, acrylic acid, methacrylic acid; derivatives of any of the foregoing; and any combination thereof. Preferably, the polymer is a copolymer. For a copolymer, preferably one of the monomers is AMPS. If the polymer is a copolymer, then the repeating units of the polymer can be random. Suitable commercially-available examples of a fluid loss additive include, but are not limited to, HALAD® 344, HALAD® 300, and HALAD® 400, marketed by Halliburton in Duncan, Okla., USA.

The polymer for the fluid loss additive is a high molecular weight polymer. The polymer can have an average molecular weight of at least 50,000. In one embodiment, the polymer has an average molecular weight in the range of about 50,000 to about 2,000,000. In another embodiment, the polymer has an average molecular weight in the range of about 500,000 to about 1,250,000.

The polymer for the fluid loss additive is water swellable.

In one embodiment, the fluid loss additive is in a concentration of at least 7% by weight of the well treatment composition. In another embodiment, the fluid loss additive is in a concentration in the range of about 7% to about 50% by weight of the well treatment composition. In another embodiment, the fluid loss additive is in a concentration in the range of about 10% to about 30% by weight of the well treatment composition.

The well treatment composition includes an amphiphilic dispersant. The amphiphilic dispersant can be a non-ionic surfactant or a hydrotrope. In one embodiment, the dispersant is a non-ionic surfactant. The non-ionic surfactant can have the following chemical formula:

$$RO-(CH_2CH_2O)_m-H$$

wherein R is an alkyl group having 13-20 carbon atoms, and wherein m is a number in the range of 17-110.

The non-ionic surfactant can be a polyoxyethylene ether. Suitable examples of a polyoxyethylene ether include, but are not limited to, polyoxyethylene (20) cetyl ether, polyoxyethylene (100) stearyl ether, polyoxyethylene (20) oleyl ether, and polyoxyethylene (20) stearyl ether, wherein the number in parentheses corresponds to 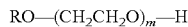 $_m$ in the above formula. Commercially-available examples of a suitable non-ionic surfactant include: BRIJ® 58, BRIJ® 700, BRIJ® 98, BRIJ® 78, available from Sigma-Aldrich in St. Louis, Mo., USA; and LUTENSOL® AT 11, LUTENSOL® AT 25, LUTENSOL® AT 50, LUTENSOL® AT 80, LUTENSOL® AT 80E, available from BASF in Florham Park, N.J., USA.

Preferably, the surfactant is in at least a sufficient concentration such that the surfactant spontaneously forms micelles (i.e., the critical micelle concentration). In one embodiment, the surfactant is in a concentration of at least 0.5% by weight of well treatment composition. In another embodiment, the surfactant is in a concentration in the range of about 0.5% to about 10% by weight of the well treatment composition. In another embodiment, the surfactant is in a concentration in the range of about 1% to about 5% by weight of the well treatment composition.

In another embodiment, the dispersant is a hydrotrope. The hydrotrope comprises a hydrophobic portion comprising a substituted benzene ring. The substituted benzene ring can be selected from the group consisting of methyl ethyl benzene (cumene), dimethyl benzene (xylene), N-butyl benzene, and dodecyl benzene. The hydrotrope comprises a hydrophilic portion comprising an anionic sulfonated group with a counter-ion. The counter-ion can be selected from the group consisting of ammonium, calcium, potassium, and sodium. Preferably, the counter-ion is sodium. The hydrotrope can be selected from the group consisting of sodium cumene sulfonate (SCS), N-butyl benzene sulfonate (NBBS), sodium xylene sulfonate (SXS), sodium dodecyl benzene sulfonate (SDBS), and any combination thereof. Preferably, the hydrotrope is selected such that the hydrotrope undergoes self-aggregation.

It is preferred that the hydrotrope is in at least a sufficient concentration such that the hydrotrope undergoes self-aggregation. In one embodiment, the hydrotrope is in a concentration of at least 5% by weight of the well treatment composition. In another embodiment, the hydrotrope is in a concentration in the range of about 5% to about 20% by weight of the well treatment composition. In another embodiment, the hydrotrope is in a concentration in the range of about 8% to about 12% by weight of the well treatment composition.

It is preferred that the well treatment composition is homogenous. Preferably, the dispersant is in at least a sufficient concentration such that the well treatment composition is homogenous. The well treatment composition can be a homogenous solution. The well treatment composition can be a homogenous colloid.

In one embodiment, the well treatment composition has a viscosity such that the well treatment composition is capable of being poured. For example, if the well treatment composition is to be included in a cement composition, then the well treatment composition can be poured from a container into a different mixing apparatus for forming the cement composition. In one embodiment, the well treatment composition has a viscosity of less than 50,000 cP (50,000 millipascals/second "mPa/s"). Preferably, the dispersant is in at least a sufficient concentration such that the well treatment composition has a viscosity of less than 50,000 cP. Preferably, the fluid loss additive is in a concentration equal to or less than a concentration such that the well treatment composition has a viscosity of less than 50,000 cP. In another embodiment, the well treatment composition has a viscosity of less than 25,000 cP (25,000 mPa/s).

In one embodiment, the well treatment composition has an activity of at least 10%. Preferably, the dispersant is in at least a sufficient concentration such that the well treatment composition has the desired activity. Preferably, the fluid loss additive is in at least a sufficient concentration such that the well treatment composition has the desired activity. In another embodiment, the well treatment composition has an activity of at least 12%. In another embodiment, the well treatment composition has an activity of at least 20%.

According to an embodiment, a method for cementing in a subterranean formation comprises: introducing a cement composition into the subterranean formation, the cement composition comprising: (i) cement; (ii) water; and (iii) the well treatment composition; and allowing the cement composition to set.

The method can further include the step of making the well treatment composition prior to the step of introducing. According to this embodiment, the step of making comprises blending the well treatment composition. Preferably, the well treatment composition is blended such that the well treatment composition is homogenous. Preferably, the well treatment composition is blended for a sufficient length of time to provide a homogenous well treatment composition. The well treatment composition can be blended via stirring the well treatment composition with a mechanical stirrer or mixing the well treatment composition with a constant-speed mixer. Preferably, the ingredients for the well treatment composition are blended in the following sequence. First, the aqueous liquid is added to the blending container, second the dispersant is added to the blending container, and third the fluid loss additive is added to the blending container. The method can further include the step of pre-blending the aqueous liquid and the dispersant. Accordingly, the step of pre-blending is performed, then the fluid loss additive is added to the pre-blended solution, then the step of blending is performed.

The method for making the well treatment composition can further include the step of storing the well treatment composition after the step of blending and prior to the step of introducing. In one embodiment, the well treatment composition is capable of being stored and during storage, the well treatment composition maintains the following characteristics: it is stable, it is homogenous, and it is capable of being poured. Preferably, the well treatment composition is capable of being stored for a time of 6 months or more, while maintaining the characteristics listed above.

The cement composition includes cement. The cement can be Class A cement, Class C cement, Class G cement, Class H cement, and any combination thereof. Preferably, the cement is Class G cement or Class H cement.

The cement composition includes water. The water can be selected from the group consisting of freshwater, brackish water, saltwater, and any combination thereof.

The cement composition includes the fluid loss additive. In one embodiment, the fluid loss additive is in a concentration of at least 0.05% by weight of the cement (bwc). In another embodiment, the fluid loss additive is in a concentration of at least 1% bwc. In another embodiment, the fluid loss additive is in a concentration in the range of about 0.05% to about 5% bwc.

The cement composition includes the dispersant. In one embodiment, the dispersant is in a concentration of at least 0.02% by weight of the cement (bwc). In another embodiment, the dispersant is in a concentration in the range of about 0.02% to about 20% by weight of the cement (bwc). In another embodiment, the dispersant for the fluid loss additive is in a concentration in the range of about 0.5% to about 12% by weight of the cement (bwc).

In an embodiment, the cement composition has a thickening time of at least 3 hours at a temperature of 125° F. (51° C.) and a pressure of 5,160 psi (36 MPa). In another embodiment, the cement composition has a thickening time in the range of about 4 to about 15 hours at a temperature of 125° F. (51° C.) and a pressure of 5,160 psi (36 MPa). Some of the variables that can affect the thickening time of the cement composition include the concentration of any set retarder included in the cement composition, the concentration of any salt present in the cement composition, and the bottomhole temperature of the subterranean formation. As used herein, the term "bottomhole" refers to the portion of the subterranean formation to be cemented. In another embodiment, the cement composition has a thickening time of at least 3 hours at the bottomhole temperature and pressure of the subterranean formation.

In one embodiment, the cement composition has an initial setting time of less than 24 hours at a temperature of 125° F. (51° C.) and a pressure of 3,000 psi (21 MPa). In another embodiment, the cement composition has an initial setting time of less than 24 hours at the bottomhole temperature and pressure of the subterranean formation.

Preferably, the cement composition has a setting time of less than 48 hours at a temperature of 125° F. (51° C.). More preferably, the cement composition has a setting time of less than 24 hours at a temperature of 125° F. (51° C.). Most preferably, the cement composition has a setting time in the range of about 3 to about 24 hours at a temperature of 125° F. (51° C.). In another embodiment, the cement composition has a setting time of less than 48 hours at the bottomhole temperature and pressure of the subterranean formation.

Preferably, the cement composition has a compressive strength of at least 500 psi (3.5 MPa) when tested at 24 hours, a temperature of 125° F. (51° C.), and a pressure of 3,000 psi (21 MPa). More preferably, the cement composition has a compressive strength in the range of about 500 to about 10,000 psi (about 3.5 to about 69 MPa) when tested at 24 hours, a temperature of 125° F. (51° C.), and a pressure of 3,000 psi (21 MPa).

In one embodiment, the cement composition has an API fluid loss of less than 200 mL/30 min at a temperature of 125° F. (51° C.) and a pressure differential of 1,000 psi (7 MPa). Preferably, the fluid loss additive is in at least a sufficient concentration such that the cement composition has the desired API fluid loss. In another embodiment, the cement composition has an API fluid loss of less than 80 mL/30 min at a temperature of 125° F. (51° C.) and a pressure differential of 1,000 psi (7 MPa). In another embodiment, the cement composition has an API fluid loss of less than 60 mL/30 min at a temperature of 125° F. (51° C.) and a pressure differential of 1,000 psi (7 MPa).

The cement composition can further include an additional additive. Examples of an additional additive include, but are not limited to, a high-density additive, a filler, a strength-retrogression additive, a set accelerator, a set retarder, a friction reducer, a mechanical property enhancing additive, a lost-circulation material, a filtration-control additive, a defoaming agent, a thixotropic additive, a nano-particle, and combinations thereof.

The cement composition can include a filler material. Suitable examples of filler materials include, but are not limited to, fly ash, sand, clays, and vitrified shale. Preferably, the filler material is in a concentration in the range of about 5% to about 50% by weight of the cement.

The cement composition can include a set retarder. Suitable examples of commercially-available set retarders include, but are not limited to, HR®4, HR®5, HR®6, HR®12, HR®20, HR®25, SCR®100, and SCR®500, marketed by Halliburton in Duncan, Okla., USA. Preferably, the set retarder is in a concentration in the range of about 0.05% to about 10% by weight of the cement.

The cement composition can include a friction reducer. Suitable examples of commercially-available friction reducers include, but are not limited to, CFR®2, CFR®3, CFR®3L, CFR®6, and CFR®8, marketed by Halliburton in Duncan, Okla., USA. Preferably, the friction reducer is in a concentration in the range of about 0.1% to about 10% by weight of the cement.

The cement composition can include a strength-retrogression additive. Suitable examples of commercially-available strength-retrogression additives include, but are not limited to, SSA®1 and SSA®2, marketed by Halliburton in Duncan, Okla., USA. Preferably, the strength-retrogression additive is in a concentration in the range of about 5% to about 50% by weight of the cement.

Commercially-available examples of other additives include, but are not limited to, High Dense-3®, High Dense-4®, Barite®, Micromax®, Silicalite®, HGS-6000®, HGS-4000®, HGS-10000®, Well life 665®, Well life 734®, Well life 809®, and Well life 810®, marketed by Halliburton in Duncan, Okla., USA.

In one embodiment, the cement composition has a density of at least 10 pounds per gallon (ppg) (1.2 kilograms per liter (kg/l)). In another embodiment, the cement composition has a density of at least 15 ppg (1.8 kg/l). In another embodiment, the cement composition has a density in the range of about 15 to about 20 ppg (about 1.8 to about 2.4 kg/l).

The method includes the step of introducing the cement composition into a subterranean formation. The cement composition can be in a pumpable state before and during introduction into the subterranean formation. In one embodiment, the cement composition is used in a subterranean formation having a bottomhole temperature of at least 150° F. (66° C.). In another embodiment, the bottomhole temperature is in the range of about 150° F. to about 500° F. (66° C. to 260° C.). In another embodiment, the bottomhole temperature is in the range of about 180° F. to about 400° F. (82° C. to 204° C.). In another embodiment, the bottomhole temperature is in the range of about 180° F. to about 350° F. (82° C. to 177° C.).

The subterranean formation can be penetrated by a well. The step of introducing can be introducing the cement composition into a well. The well can include an annulus. The well can be an oil, gas, water, or injection well. The step of introducing is for the purpose of at least one of the following: well completion; foam cementing; primary or secondary cementing operations; well-plugging; and gravel packing. The step of introducing can be introducing the cement composition into an annulus.

The method also includes the step of allowing the cement composition to set. The step of allowing can be after the step of introducing the cement composition into the subterranean formation. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in an aqueous solution, a suspension, or a cement composition can be expressed as: by weight of the aqueous solution (abbreviated as "bwas"); by weight of the suspension (abbreviated as "bws"); or by weight of the cement (abbreviated as "bwc"). HALAD® 344 fluid loss additive is a water-swellable AMPS based random co-polymer, having an average molecular weight of >50,000. SCS dispersant is a hydrotrope of sodium cumene sulfonate. BRIJ® 58 dispersant is a non-ionic surfactant of polyoxyethylene (20) cetyl ether. HALAD® 344 EXP is an oil-based suspension containing mineral oil as the continuous phase of the suspension and HALAD® 344 fluid loss additive at a concentration of 38% bws.

Any of the aqueous solutions containing a dispersant were prepared at ambient temperature and pressure as follows. The required amount of water was added to a blending container. The dispersant was then added to the blending container and dissolved by using a mechanical stirrer at an rpm of 500-2,500 until a clear solution is obtained. The fluid loss additive was then added to the water/dispersant solution in the blending container. The fluid loss additive was then dissolved using the same mechanical stirrer at an rpm of 500-2,500 until the fluid loss additive dissolves. All cement compositions were mixed and tested according to the specified procedure for the specific test as described in The Detailed Description section above.

Table 1 contains fluid loss data for several cement compositions containing SCS dispersant. Aqueous solutions, according to certain embodiments were prepared with deionized water, HALAD® 344 fluid loss additive at a concentration of 15% bwas, and varying concentrations of SCS bwas. Each of the aqueous solutions were then added to Class H cement and deionized water such that the HALAD® 344 was in a concentration of 1% bwc. The cement compositions had a density of 16.4 pounds per gallon (ppg) (2 kilograms per liter (kg/l)). The cement compositions were tested for API fluid loss at a temperature of 190° F. (88° C.) and a pressure differential of 1,000 psi (7 MPa). As can be seen in Table 1, SCS functions as an effective dispersant for HALAD® 344. At SCS concentrations of 10% and 20%, the cement compositions have an API fluid loss of 26 mL/30 min.

TABLE 1

| SCS Concentration in Aqueous solution (bwas) | API Fluid Loss (mL/30 mins) |
|---|---|
| 20% | 26 |
| 10% | 26 |
| 5% | 34 |
| 2.5% | 39 |

Tables 2a-2e contain viscosity data for HALAD® 344 EXP and several aqueous solutions. For Tables 2a-2e, where $k_1$ is a constant that depends on the FYSA in units of 1/s; $k_2$ is a constant that depends on the FYSA in units of Pa; Table 2a contains data for HALAD® 344 EXP. Tables 2b-2e contain data for several aqueous solutions containing deionized water as the solvent. For Table 2b, the aqueous solution contained 12% bwas HALAD® 344 fluid loss additive and 2% bwas BRIJ® 58 dispersant. For Table 2c, the aqueous solution contained 15% bwas HALAD® 344 fluid loss additive and 2% bwas BRIJ® 58 dispersant. For Table 2d, the aqueous solution contained 20% bwas HALAD® 344 fluid loss additive and 2% bwas BRIJ® 58 dispersant. For Table 2e, the aqueous solution contained 12% bwas HALAD® 344 fluid loss additive and 10% bwas SCS dispersant.

As can be seen in Tables 2a-2e, the aqueous solutions containing 12% or 15% HALAD® 344 fluid loss additive and 2% BRIJ® 58 dispersant (Tables 2b and 2c) exhibited lower viscosities compared to HALAD® 344 EXP (Table 2a). As can also be seen, the aqueous solution containing 12% HALAD® 344 fluid loss additive and 10% SCS dispersant (Table 2e) exhibited lower viscosities compared to HALAD® 344 EXP.

TABLE 2a

| rpm | Shear Rate (1/sec) | Dial Reading | Shear Stress (Pa) | Viscosity (Pa * s) | Viscosity (cP) |
|---|---|---|---|---|---|
| 3 | 0.87 | 28 | 19.68 | 22.7036 | 22703.6 |
| 6 | 1.73 | 34 | 23.90 | 13.7843 | 13784.3 |
| 30 | 8.67 | 70 | 49.21 | 5.6759 | 5675.9 |
| 60 | 17.34 | 104 | 73.11 | 4.2164 | 4216.4 |
| 100 | 28.9 | 139 | 97.72 | 3.3812 | 3381.2 |
| 200 | 57.8 | 218 | 153.25 | 2.6515 | 2651.4 |
| 300 | 86.7 | 298 | 209.49 | 2.4163 | 2416.3 |
| 600 | 173.4 | +300 | — | — | — |

TABLE 2b

| rpm | Shear Rate (1/sec) | Dial Reading | Shear Stress (Pa) | Viscosity (Pa * s) | Viscosity (cP) |
|---|---|---|---|---|---|
| 3 | 0.87 | 6 | 4.22 | 4.8651 | 4865.1 |
| 6 | 1.73 | 10 | 7.03 | 4.0542 | 4054.2 |

TABLE 2b-continued

| rpm | Shear Rate (1/sec) | Dial Reading | Shear Stress (Pa) | Viscosity (Pa * s) | Viscosity (cP) |
|---|---|---|---|---|---|
| 30 | 8.67 | 34 | 23.90 | 2.7569 | 2756.9 |
| 60 | 17.34 | 58 | 40.77 | 2.3514 | 2351.4 |
| 100 | 28.9 | 84 | 59.05 | 2.0433 | 2043.3 |
| 200 | 57.8 | 132 | 92.79 | 1.6055 | 1605.5 |
| 300 | 86.7 | 170 | 119.51 | 1.3784 | 1378.4 |
| 600 | 173.4 | 263 | 184.89 | 1.0663 | 1066.3 |

TABLE 2c

| rpm | Shear Rate (1/sec) | Dial Reading | Shear Stress (Pa) | Viscosity (Pa * s) | Viscosity (cP) |
|---|---|---|---|---|---|
| 3 | 0.87 | 14 | 9.84 | 11.3518 | 11351.8 |
| 6 | 1.73 | 24 | 16.87 | 9.7301 | 9730.1 |
| 30 | 8.67 | 77 | 54.13 | 6.2435 | 6243.5 |
| 60 | 17.34 | 124 | 87.17 | 5.0272 | 5027.2 |
| 100 | 28.9 | 177 | 124.43 | 4.3056 | 4305.6 |
| 200 | 57.8 | 176 | 123.73 | 2.1406 | 2140.6 |
| 300 | 86.7 | +300 | — | — | — |
| 600 | 173.4 | +300 | — | — | — |

TABLE 2d

| rpm | Shear Rate (1/sec) | Dial Reading | Shear Stress (Pa) | Viscosity (Pa * s) | Viscosity (cP) |
|---|---|---|---|---|---|
| 3 | 0.87 | 41 | 28.82 | 33.2445 | 33244.5 |
| 6 | 1.73 | 69 | 48.51 | 27.9741 | 27974.1 |
| 30 | 8.67 | 204 | 143.41 | 16.5412 | 16541.2 |
| 60 | 17.34 | +300 | — | — | — |
| 100 | 28.9 | +300 | — | — | — |
| 200 | 57.8 | +300 | — | — | — |
| 300 | 86.7 | +300 | — | — | — |
| 600 | 173.4 | +300 | — | — | — |

TABLE 2e

| rpm | Shear Rate (1/sec) | Dial Reading | Shear Stress (Pa) | Viscosity (Pa * s) | Viscosity (cP) |
|---|---|---|---|---|---|
| 3 | 0.87 | 6 | 4.23 | 4.8650 | 4865.1 |
| 6 | 1.73 | 11 | 7.73 | 4.4596 | 4459.6 |
| 30 | 8.67 | 38 | 26.71 | 3.0812 | 3081.1 |
| 60 | 17.34 | 64 | 44.99 | 2.5947 | 2594.7 |
| 100 | 28.9 | 91 | 63.97 | 2.2136 | 2213.6 |
| 200 | 57.8 | 150 | 105.45 | 1.8244 | 1824.4 |
| 300 | 86.7 | 194 | 136.38 | 1.5730 | 1573.0 |
| 600 | 173.4 | 270 | 189.81 | 1.0946 | 1094.6 |

Table 3 contains rheology and fluid loss data for several cement compositions having a density of 16.4 ppg (2 kg/l). The cement compositions were tested for API fluid loss at a temperature of 125° F. (51° C.) and 190° F. (88° C.), and a pressure differential of 1,000 psi (7 MPa). In one cement composition, HALAD®344 fluid loss additive was added as a powder to Class H cement and deionized (DI) water to form the cement composition. In another cement composition, HALAD® 344 EXP was added to Class H cement and DI water to form the cement composition. In another cement composition, an aqueous solution was prepared using DI water as the solvent, 20% bwas HALAD® 344 fluid loss additive, and 2% bwas BRIJ® 58 dispersant, and the solution was then added to Class H cement and DI water to form the cement composition. In another cement composition, an aqueous solution was prepared using DI water as the solvent, 15% bwas HALAD® 344 fluid loss additive, and 10% bwas SCS dispersant, and the solution was then added to Class H cement and DI water to form the cement composition. The concentration of HALAD® 344 fluid loss additive, either as a powder or from HALAD® 344 EXP and the solutions, is expressed as a percentage by weight of the cement (% bwc). For example, if powdered HALAD®344 fluid loss additive was added at a concentration of 0.6% bwc, then for an aqueous solution containing HALAD® 344 fluid loss additive at a concentration of 20% bwas, a calculated volume of the aqueous solution was added to the cement and water to form a cement composition such that there was 0.6% bwc of HALAD® 344 fluid loss additive in the cement composition.

As can be seen in Table 3, both of the cement compositions containing the aqueous solutions, exhibited similar rheologies and fluid loss compared to both, the cement composition that contained HALAD® 344 fluid loss additive as a powder and the cement composition that contained HALAD® 344 EXP.

TABLE 3

| Source of HALAD® 344 | Concen. of HALAD® 344 (% bwc) | Temp. (° F.) | Rotational Viscometer | | | | | API Fluid Loss (mL/30 min) |
|---|---|---|---|---|---|---|---|---|
| | | | 300 | 200 | 100 | 6 | 3 | |
| Powder | 0.6 | 125 | 184 | 142 | 86 | 8 | 7 | 38 |
|  | 1 | 190 | >300 | 250 | 150 | 16 | 9 | 26 |
| HALAD® 344 EXP | 0.6 | 125 | 261 | 190 | 112 | 12 | 79 | 30 |
|  | 1 | 190 | >300 | 230 | 140 | 47 | 32 | 24 |
| Aqueous solution with 20% bwas HALAD® 344 and 2% bwas BRIJ® 58 | 0.6 | 125 | 253 | 189 | 113 | 14 | 8 | 36 |
|  | 1 | 190 | >300 | >300 | 209 | 30 | 15 | 34 |
| Aqueous solution with 15% bwas HALAD® 344 and 10% bwas SCS | 0.6 | 125 | 188 | 141 | 90 | 11 | 6 | 32 |
|  | 1 | 190 | >300 | 256 | 175 | 30 | 19 | 26 |

Table 4 contains thickening time, initial setting time, time to reach 500 psi, and compressive strength data for several cement compositions having a density of 16.4 ppg (2 kg/l). In one cement composition, HALAD® 344 fluid loss additive was added as a powder to Class H cement and DI water to form the cement composition. In another cement composition, HALAD® 344 EXP was added to Class H cement and DI water to form the cement composition. In another cement composition, an aqueous solution, was prepared using DI water as the solvent, 20% bwas HALAD® 344 fluid loss additive, and 2% bwas BRIJ® 58 dispersant, and the solution was then added to Class H cement and DI water to form the cement composition. In another cement composition, an aqueous solution, was prepared using DI water as the solvent, 15% bwas HALAD® 344 fluid loss additive, and 10% bwas SCS dispersant, and the solution was then added to Class H cement and DI water to form the cement composition. Each of the cement compositions contained HALAD®344 fluid loss additive at a concentration of 0.6% bwc and HR®5 set retarder at a concentration of 0.2% bwc. The thickening time test was conducted at a temperature of 125° F. (51° C.) and a pressure of 5,160 psi (36 MPa). The tests for initial setting time, time to reach 500 psi, and compressive strength were conducted at a temperature of 125° F. (51° C.) and a pressure of 3,000 psi (21 MPa).

As can be seen in Table 4, both of the cement compositions containing the aqueous solutions, exhibited a similar thickening time, initial setting time, time to reach 500 psi, and compressive strength compared to both, the cement composition containing HALAD® 344 fluid loss additive as a powder and the cement composition containing HALAD® 344 EXP.

TABLE 4

| Source of HALAD® 344 | Thickening Time (hr:min) | Initial Setting Time (hr:min) | Time to Reach 500 psi (hr:min) | Compressive Strength at 24 hrs (psi) |
|---|---|---|---|---|
| Powder | 10:27 | 17:35 | 19:38 | 1595.5 |
| HALAD® 344 EXP | 8:15 | 17:36 | 19:36 | 1613.4 |
| Aqueous solution with 20% bwas HALAD® 344 and 2% bwas BRIJ® 58 | 9:28 | 17:01 | 18:52 | 1830.5 |
| Aqueous solution with 15% bwas HALAD® 344 and 10% bwas SCS | 9:27 | 17:20 | 19:34 | 1749.9 |

The experiments for Table 5 were conducted to evaluate the salt tolerance of aqueous solutions. Table 5 contains rheology and fluid loss data for several cement compositions having a density of 16.5 ppg (2 kg/l). The cement compositions were tested for API fluid loss at a temperature of 135° F. (57° C.) and a pressure differential of 1,000 psi (7 MPa). The cement compositions were tested for fluid loss at a temperature of 135° F. (57° C.) and a pressure differential of 1,000 psi (7 MPa). Each of the cement compositions contained at least Class H cement, deionized (DI) water, 10% bwc of sodium chloride, 0.6% bwc HALAD® 344 fluid loss additive, and 0.1% bwc HR®5 set retarder. One of the cement compositions contained HALAD® 344 fluid loss additive as a powder and did not include a dispersant. Another cement composition included an aqueous solution, containing DI water as the solvent, 20% bwas HALAD® 344 fluid loss additive, and 2% bwas BRIJ® 58 dispersant. Another cement composition included an aqueous solution, containing DI water as the solvent, 15% bwas HALAD® 344 fluid loss additive, and 10% bwas SCS dispersant.

As can be seen in Table 5, both of the cement compositions containing the aqueous solutions, exhibited similar rheologies and a lower fluid loss compared to the cement composition that contained HALAD® 344 fluid loss additive as a powder.

TABLE 5

| Source of HALAD® 344 | Temp. (° F.) | Rotational Viscometer | | | | | API Fluid Loss (mL/30 min) |
|---|---|---|---|---|---|---|---|
| | | 300 | 200 | 100 | 6 | 3 | |
| Powder | 135 | 169 | 121 | 74 | 16 | 11 | 200.8 |
| Aqueous solution with 20% bwas HALAD® 344 and 2% bwas BRIJ® 58 | 135 | 139 | 105 | 70 | 29 | 19 | 140.5 |
| Aqueous solution with 15% bwas HALAD® 344 and 10% bwas SCS | 135 | 177 | 130 | 78 | 15 | 11 | 172.5 |

Table 6 contains rheology and fluid loss data for several cement compositions having a density of 17 ppg (2 kg/l). The cement compositions were tested for fluid loss at a temperature of 190° F. (88° C.) and a pressure differential of 1,000 psi (7 MPa). Each of the cement compositions contained at least Class H cement, deionized (DI) water, 0.4% bwc HALAD® 344 fluid loss additive, 0.4% bwc HALAD® 413 fluid loss additive, 35% bwc SSA®1 strength-retrogression additive, 0.8% bwc HR®25 set retarder, 0.8% SCR®100 set retarder, and 0.3% bwc CFR®3 friction reducer. For one of the cement compositions, HALAD® 344 fluid loss additive was added as a powder. Another cement composition included an aqueous solution, containing DI water as the solvent, 20% bwas HALAD® 344 fluid loss additive, and 2% bwas BRIJ® 58 dispersant. Another cement composition included an aqueous solution, containing DI water as the solvent, 15% bwas HALAD® 344 fluid loss additive, and 10% bwas SCS dispersant.

As can be seen in Table 6, both of the cement compositions containing the aqueous solutions, exhibited similar rheologies and lower fluid loss compared to the cement composition containing HALAD® 344 fluid loss additive as a powder. HALAD® 344 fluid loss additive, BRIJ®58 dispersant, and SCS show good compatibility with other additives commonly included in a cement composition.

TABLE 6

| Source of HALAD® 344 | Temp. (° F.) | Rotational Viscometer | | | | | API Fluid Loss (mL/30 min) |
|---|---|---|---|---|---|---|---|
| | | 300 | 200 | 100 | 6 | 3 | |
| Powder | 190 | >300 | >300 | 273 | 29 | 19 | 46 |
| Aqueous solution with 20% bwas HALAD® 344 and 2% bwas BRIJ® 58 | 190 | >300 | 235 | 145 | 20 | 16 | 24 |
| Aqueous solution with 15% bwas HALAD® 344 and 10% bwas SCS | 190 | >300 | 277 | 165 | 18 | 9 | 34 |

The experiments for Table 7 were conducted to evaluate the stability and homogeneity for aqueous solutions over time. Table 7 contains rheology and fluid loss data for eight different cement compositions having a density of 16.5 ppg (2 kg/l). The cement compositions were tested for fluid loss at a temperature of 125° F. and 190° F. (52° C. and 88° C.) and a pressure differential of 1,000 psi (7 MPa). Two different aqueous solutions were prepared with DI water as the solvent and: 1) 20% bwas HALAD® 344 fluid loss additive and 2% bwas BRIJ® 58 dispersant; and 2) 15% bwas HALAD® 344 fluid loss additive and 10% bwas SCS dispersant. A calculated aliquot of each of the aqueous solutions were added to Class H cement and DI water immediately after preparing the aqueous solutions to form four of the eight cement compositions (Time 0) with HALAD® 344 fluid loss additive at a concentration of 0.6% bwc and 1% bwc, respectively. Another calculated aliquot of each of the aqueous solutions were added to Class H cement and DI water 6 months after preparing the aqueous solutions to form the other four cement compositions (Time 6 months) with HALAD® 344 fluid loss additive at a concentration of 0.6% bwc and 1% bwc, respectively.

As can be seen in Table 7, the cement compositions containing both of the aqueous solutions at Time 0, exhibited similar properties and homogeneity compared to cement compositions that contained both of the aqueous solutions at Time 6 months. Moreover, the cement compositions containing both of the aqueous solutions at Time 6 months, exhibited decreased Fluid Loss and improved rheology compared to the cement compositions containing the aqueous solutions at Time 0.

TABLE 7

| Source of HALAD® 344 | Conc. HALAD® 344 (% bwc) | Temp. (° F.) | Rotational Viscometer | | | | | API Fluid Loss (mL/30 min) |
| --- | --- | --- | --- | --- | --- | --- | --- | --- |
| | | | 300 | 200 | 100 | 6 | 3 | |
| Aqueous solution with 20% bwas HALAD® 344 and 2% bwas BRIJ® 58 (Time 0) | 0.6 | 125 | 253 | 189 | 113 | 14 | 8 | 36 |
| | 1 | 190 | >300 | >300 | 209 | 30 | 15 | 34 |
| Aqueous solution with 20% bwas HALAD® 344 and 2% bwas BRIJ® 58 (Time 6 months) | 0.6 | 125 | 169 | 125 | 75 | 10 | 8 | 28 |
| | 1 | 190 | — | — | — | — | — | — |
| Aqueous solution with 15% bwas HALAD® 344 and 10% bwas SCS (Time 0) | 0.6 | 125 | 188 | 141 | 90 | 11 | 6 | 32 |
| | 1 | 190 | >300 | 256 | 175 | 30 | 19 | 26 |
| Aqueous solution with 15% bwas HALAD® 344 and 10% bwas SCS (Time 6 months) | 0.6 | 125 | 184 | 134 | 86 | 10 | 6 | 32 |
| | 1 | 190 | 290 | 224 | 193 | 35 | 25 | 26 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A well treatment composition for use in a cement composition comprising:
   an aqueous liquid;
   a fluid loss additive, wherein the fluid loss additive comprises a high molecular weight, water-swellable polymer, wherein the polymer for the fluid loss additive comprises: cellulose; guar; xanthan; starch; a monomer or monomers selected from the group consisting of acrylamido-methyl-propane sulfonate (AMPS), N-vinyl-N-methylaceamide, N-vinylformamide, N-vinylpyrrolidone, acrylonitrile, acrylamide, acrylomorpholine, vinyl alcohol, maleic anhydride, acrylic acid, methacrylic acid; and any combination thereof; and
   an amphiphilic dispersant, wherein the dispersant is a non-ionic surfactant, and wherein the surfactant has the following chemical formula:

RO—(CH$_2$CH$_2$O)$_m$—H wherein R is an alkyl group having 13-20 carbon atoms, and wherein m is a number in the range of 17-110,
   wherein the well treatment composition has an activity of at least 10%,
   wherein the well treatment composition does not include cement, wherein the fluid loss additive is in a concentration of about 20% to about 50% by weight of the treatment composition, and wherein the non-ionic surfactant is in a concentration of about 5% to about 50% by weight of the treatment composition.

2. The composition according to claim 1, wherein the well treatment composition is homogenous.

3. The composition according to claim 1, wherein the well treatment composition is a solution, wherein the solution comprises a solvent and at least one solute.

4. The composition according to claim 3, wherein the aqueous liquid is the solvent of the solution.

5. The composition according to claim 1, wherein the polymer for the fluid loss additive has an average molecular weight in the range of about 50,000 to about 2,000,000.

6. The composition according to claim 1, wherein the surfactant is selected from the group consisting of polyoxyethylene (20) cetyl ether, polyoxyethylene (100) stearyl ether, polyoxyethylene (20) oleyl ether, polyoxyethylene (20) stearyl ether, and any combination thereof.

7. The composition according to claim 1, wherein the surfactant is in at least a sufficient concentration such that the surfactant spontaneously forms micelles.

8. The composition according to claim 1, wherein the dispersant is in at least a sufficient concentration such that the well treatment composition is homogenous.

9. The composition according to claim 1, wherein the well treatment composition has a viscosity of less than 50,000 cP (50,000 millipascals/second "mPa/s").

10. The composition according to claim 1, wherein the well treatment composition has an activity of at least 20%.

11. A well treatment composition for use in a cement composition comprising:
an aqueous liquid;
a fluid loss additive, wherein the fluid loss additive comprises a high molecular weight, water-swellable polymer, wherein the polymer for the fluid loss additive comprises: cellulose; guar; xanthan; starch; a monomer or monomers selected from the group consisting of acrylamido-methyl-propane sulfonate (AMPS), N-vinyl-N-methylaceamide, N-vinylformamide, N-vinylpyrrolidone, acrylonitrile, acrylamide, acrylomorpholine, vinyl alcohol, maleic anhydride, acrylic acid, methacrylic acid; and any combination thereof; and
an amphiphilic dispersant, wherein the dispersant is a hydrotrope,
wherein the well treatment composition has an activity of at least 10%,
wherein the well treatment composition does not include cement,
wherein the fluid loss additive is in a concentration of about 20% to about 50% by weight of the treatment composition, and
wherein the hydrotrope is in a concentration of about 10% to about 20% by weight of the treatment composition.

12. The composition according to claim 11, wherein the polymer for the fluid loss additive has an average molecular weight in the range of about 50,000 to about 2,000,000.

13. The composition according to claim 11, wherein the hydrotrope is selected from the group consisting of sodium cumene sulfonate, N-butyl benzene sulfonate, sodium xylene sulfonate, sodium dodecyl benzene sulfonate, and any combination thereof.

14. The composition according to claim 11, wherein the hydrotrope is selected such that the hydrotrope undergoes self-aggregation.

* * * * *

UNITED STATES PATENT AND TRADEMARK OFFICE
CERTIFICATE OF CORRECTION

| | |
|---|---|
| PATENT NO. | : 8,741,817 B2 |
| APPLICATION NO. | : 13/553767 |
| DATED | : June 3, 2014 |
| INVENTOR(S) | : Abhijit Tarafdar et al. |

Page 1 of 1

It is certified that error appears in the above-identified patent and that said Letters Patent is hereby corrected as shown below:

In the Claims

Claim 1, column 21, line 5: "about 5% to about 50%" should be changed to "about 5% to about --10%--"

Signed and Sealed this
Ninth Day of September, 2014

Michelle K. Lee
*Deputy Director of the United States Patent and Trademark Office*